US008082267B1

(12) United States Patent
Murphy et al.

(10) Patent No.: US 8,082,267 B1
(45) Date of Patent: Dec. 20, 2011

(54) PARCEL RECORD INFORMATION SYSTEM MANAGEMENT

(75) Inventors: Joshua T. Murphy, Birmingham, AL (US); Janice D. Moore-Smith, Birmingham, AL (US); Jason Ramsey, Birmingham, AL (US); Evan Koch, Birmingham, AL (US)

(73) Assignee: Southern Company Services, Inc., Atlanta, GA (US)

( * ) Notice: Subject to any disclaimer, the term of this patent is extended or adjusted under 35 U.S.C. 154(b) by 258 days.

(21) Appl. No.: 12/460,732

(22) Filed: Jul. 23, 2009

(51) Int. Cl.
*G06F 17/30* (2006.01)
(52) U.S. Cl. .................................................. 707/769
(58) Field of Classification Search .................. None
See application file for complete search history.

(56) References Cited

U.S. PATENT DOCUMENTS

| 7,107,239 | B2 * | 9/2006 | Graff | 705/36 R |
| 2005/0038721 | A1 * | 2/2005 | Goeckel et al. | 705/30 |
| 2009/0144097 | A1 * | 6/2009 | Fassio et al. | 705/7 |

* cited by examiner

*Primary Examiner* — Belinda Xue
(74) *Attorney, Agent, or Firm* — Womble Carlyle Sandridge & Rice, LLP

(57) ABSTRACT

A method, system, and computer readable storage medium for management of land parcel records for a utility. The system includes a database for storing a plurality of documents pertaining to land parcels and at least one hardware server for executing a plurality of components. The plurality of components include a component for entering and storing a plurality of information for transmission lines; a component for entering and storing a plurality of information for distribution permits; a component for entering and storing a plurality of information for at least one of fee lands, land sales, land leases, and land easements; a component for querying the database to retrieve documents based on at least one search attribute; and a component for enabling a user to perform administrative actions on a plurality of project and land parcel records stored in the database.

24 Claims, 16 Drawing Sheets

| Search | Results | Images |
|---|---|---|

Document

Parcel Number:

File Number:

Application Type:

Subapp Type:

Work Estimate:

Project:

Location Number:

Affects:

Date Signed:

[ ] to [ ]

Signer

First Name:

Last Name:

Organization:

Role:

Miscellaneous:

Drawing Number:

Lease Type:

Rights Sold:

Agent:

Location

State: Alabama

County:

City:

Township:

Range:

Section:

Grant:

Quarter/Quarter:

[ ] Select All

| NW/NW | NE/NW | NW/NE | NE/NE |
|---|---|---|---|
| SW/NW | SE/NW | SW/NE | SE/NE |
| NW/SW | NE/SW | NW/SE | NE/SE |
| SW/SW | SE/SW | SW/SE | SE/SE |

Mile Marker:

Transformer:

Filing

County:

City:

Subdivision:

Addition:

Sector:

Plat/Map Book:

Plat/Map Page:

Block:

Lot:

Recordation

County:

Book:

Page:

Recordation Date

[ ] to [ ]

1200

Selected Search:

Clear All
Run Search

FIG. 12

| Search | Results | Images |
|---|---|---|

Search Results ⟋ 1310

| Parcel Number | Application Type | Work Estimate |
|---|---|---|
| 123459 | DISTRIBUTION PERMITS | SUMTER COUNTY RURAL LINE # 28-B OFF CUBA DIST. SUBSTAT |
| 123459 | DISTRIBUTION PERMITS | SUMTER COUNTY RURAL LINE # 28-B OFF CUBA DIST. SUBSTAT |
| 123458 | DISTRIBUTION PERMITS | POST OAK- WELLINGTON-EROUGHTON-J.L. REAVES OFF WEAVE |
| 123458 | DISTRIBUTION PERMITS | POST OAK- WELLINGTON-EROUGHTON-J.L. REAVES OFF WEAVE |
| 123458 | DISTRIBUTION PERMITS | POST OAK- WELLINGTON-EROUGHTON-J.L. REAVES OFF WEAVE |
| 123457 | DISTRIBUTION PERMITS | POST OAK- WELLINGTON-EROUGHTON-J.L. REAVES OFF WEAVE |
| 123457 | DISTRIBUTION PERMITS | POST OAK- WELLINGTON-EROUGHTON-J.L. REAVES OFF WEAVE |
| 123456-A | DISTRIBUTION PERMITS | PAUL ELLIS OFF BREWTON 7.2 KV SUBSTATION |
| 123456-A | DISTRIBUTION PERMITS | PAUL ELLIS OFF BREWTON 7.2 KV SUBSTATION |
| 123456-A | DISTRIBUTION PERMITS | PAUL ELLIS OFF BREWTON 7.2 KV SUBSTATION |

1 2 ≥         1 – 20 of 31

Find In Results

[Find]  [View Original Results]

[Images] [Associated Images]   [Project Images]   [Print]   [Email]   [Export]

PRISM Permissions Report

User Name    abates

Application Access
    FEE LANDS
    TRANSMISSION LINES

Query Access
    DISTRIBUTION PERMITS
    FEE LANDS
    LAND SALES AND LEASING
    TRANSMISSION LINES
    TRD User Name    abooth

Application Access
    DISTRIBUTION PERMITS
    FEE LANDS
    LAND SALES AND LEASING
    SPAMS
    TRANSMISSION LINES
    TRD

Query Access
    ADMIN FUNCTIONS
    DISTRIBUTION PERMITS
    FEE LANDS
    IMAGE RECONCILIATION
    LAND SALES AND LEASING
    SPAMS
    TRANSMISSION LINES
    TRD

FIG. 16

PARCEL RECORD INFORMATION SYSTEM MANAGEMENT

TECHNICAL FIELD

Embodiments of the invention are directed generally to land information management systems and, more particularly, to management of parcel records for an electric utility.

BACKGROUND OF THE INVENTION

Property management is a major concern for electric utilities. Over long periods of time, electric utilities have acquired massive amounts of land records relating to land acquisitions. Many of the land records are either deeds or hand-drawn maps.

Utilities, such as electric power companies, have used several different databases and information systems that work separately to store information related to land records. Several off the shelf systems exist to manage records and documents, e.g., Documentum, and SharePoint.

SUMMARY OF THE INVENTION

Parcel Record Information System Management (PRISM) is a document management software tool that allows a utility to store all real estate documents pertaining to a utility's real estate transactions, and all information related to the real estate documents. PRISM includes a searchable database that utilizes fields and information specific to the business processes of a utility. The functionality included in PRISM allows PRISM to be used as a project management tool for a utility's distribution, transmission and fee land real estate projects.

In one embodiment of the invention, a web-based system, method, and computer readable storage medium are provided for management of land parcel records for a utility. The system includes a database for storing a plurality of documents pertaining to land parcels and at least one hardware server for executing a plurality of components. The plurality of components include a component for entering and storing a plurality of information for transmission lines; a component for entering and storing a plurality of information for distribution permits; a component for entering and storing a plurality of information for at least one of fee lands, land sales, land leases, and land easements; a component for querying the database to retrieve documents based on at least one search attribute; and a component for enabling a user to perform administrative actions on a plurality of project and land parcel records stored in the database.

BRIEF DESCRIPTION OF THE DRAWINGS

These and other advantages and aspects of the embodiments of the invention will become apparent and more readily appreciated from the following detailed description of the embodiments taken in conjunction with the accompanying drawings, as follows.

FIG. 12 illustrates an exemplary PRISM Query search screen.

FIG. 13 illustrates an exemplary Query Results screen.

FIG. 16 illustrates an exemplary user permissions report for PRISM application and query access.

DETAILED DESCRIPTION

The following description of the embodiments is provided as an enabling teaching of the invention and its best, currently known embodiments. Those skilled in the relevant art will recognize that many changes can be made to the embodiments described, while still obtaining the beneficial results. It will also be apparent that some of the desired benefits of the embodiments described can be obtained by selecting some of the features of the embodiments without utilizing other features. Accordingly, those who work in the art will recognize that many modifications and adaptations to the embodiments described are possible and may even be desirable in certain circumstances, and are a part of the invention. Thus, the following description is provided as illustrative of the principles of the embodiments of the invention and not in limitation thereof, since the scope of the invention is defined by the claims.

Various well-known acronyms are used in the following description, including:
ASP—Microsoft acronym for Active Server Pages
SQL—standard acronym for Structured Query Language
MB—standard acronym for Megabyte
GHz—standard acronym for Gigahertz
RAM—standard acronym for random access memory
CD ROM—standard acronym for Compact Disc Read-Only Memory
SP—Microsoft acronym for Service Pack
v—standard acronym in software industry for version number PRISM serves as a quick retrieval document management system, saving numerous man hours of physical research. PRISM serves as a project management tracking tool in managing data critical to ongoing Transmission and Distribution acquisition projects.

System Overview

In general, a utility's corporate real estate (CRE) division uses various separate standalone applications to capture real estate document data. PRISM is an integrated software tool that includes, but is not limited to, the following data entry Windows applications: Fee Lands, Transmission Lines, Distribution Permits, and Land Sales, Leasing and Easements. In order to manage large amount of reference data, such as city, state, image types, document type, etc., PRISM also includes an administration utility called Admin Functions. A web application called PRISM Query provides users with a powerful method for locating document data quickly. PRISM also maintains a Public Utility Assessment (PUA) Access application and database that can be used to reconcile property taxes. The PRISM system also allows the attachment of scanned images of the documents to the real estate document data.

In order to improve availability, decrease maintenance costs, and increase user efficiency, PRISM consolidates the Fee Lands, Transmission Lines, Distribution Permits, Land Sales, Leasing and Easements, Admin Functions and Query applications into one central web application. The application can be a distributed Microsoft ASP.NET 2.0 application utilizing the Microsoft SQL Server 2000 (or later version) database and SQL Server Reporting Services.

System Architecture

Figure 1:
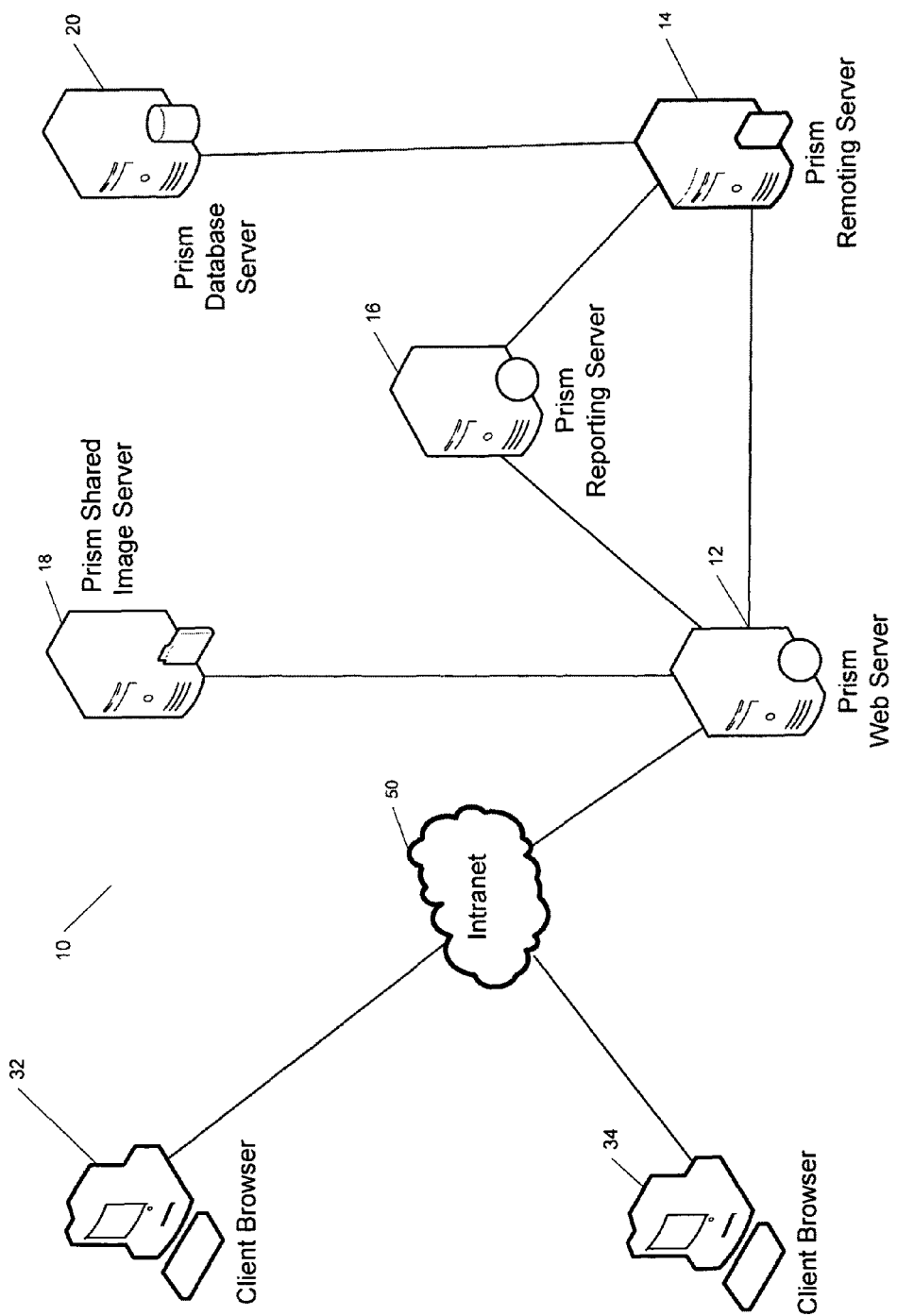
FIG. 1 illustrates a basic representation of the physical system architecture of PRISM in an exemplary embodiment.

In an exemplary embodiment, PRISM is an n-tier web application hosted on a utility's intranet. PRISM contains a web component and a remoting component, each component residing on separate servers. The application accesses the PRISM database. FIG. 1 illustrates a basic representation of the physical system architecture of the PRISM system 10. PRISM system components include web server 12, remoting server 14, reporting server 16, image server 18, and database server 20. PRISM system 10 is web-based and communicates with client browsers 32, 34 via an intranet 50.

In an exemplary embodiment, PRISM's infrastructure includes hardware and software that must satisfy certain requirements described herein. The hardware for implementation of PRISM could include, but is not limited to, the following:

Consolidated PRISM Web Server (Dedicated):
    Dual Core Intel® Xeon® E5205, 6 MB Cache, 1.86 GHz or higher 4 GB RAM or higher.
Consolidated PRISM Remoting Host (Shared):
    Dual Core Intel® Xeon® E5205, 6 MB Cache, 1.86 GHz or higher 4 GB RAM or higher.

The software for implementation of PRISM could include, but is not limited to, the following:

Web Servers:
    Microsoft Windows Server 2003 SP2
    Microsoft Internet Information Services v6.0 or higher
    Microsoft .NET Framework v2.0 SP1
Remoting Servers:
    Microsoft Windows Server 2003 SP2
    Microsoft Internet Information Services v6.0 or higher
    Microsoft .NET Framework v2.0 SP1 Client
Client Desktop:
    Microsoft Windows XP SP2
    Microsoft .NET Framework v3.0
    Office 2003 with Office 2003 Compatibility Pack
    Internet Explorer version 7 or later
Reporting Server:
    Microsoft Windows Server 2003 SP2
    Microsoft Internet Information Services v6.0 or higher
    Microsoft .NET Framework v2.0 SP1
Database Server:
    SQL Server 2000 (or later versions)
    Consolidated PRISM Database
    Microsoft Windows Server 2003 SP2

Web application access is controlled via user roles in the PRISM applications. Users are authenticated using a web authorization tool. Web application access is determined via a user table in the PRISM database. Once a user has been verified, that user will have access to specified PRISM functionality. In addition to application specific permissions, the query result data a user is permitted to view will be restricted based on the user's PRISM application access permissions, also stored in the PRISM database. The username is passed to the database when the query is executed in order to filter the results.

Figure 2:
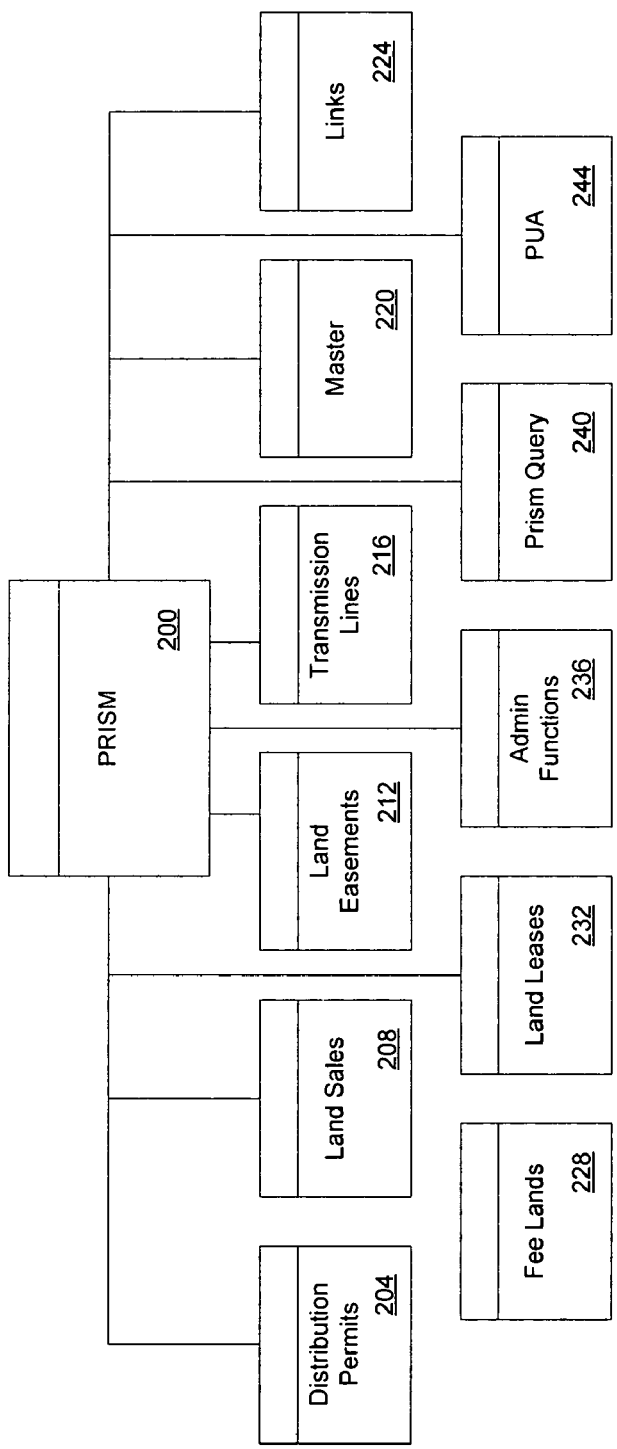
FIG. 2 illustrates an overview of the PRISM software applications in an exemplary embodiment.

FIG. 2 illustrates a high level overview of the PRISM software applications 200 in an exemplary embodiment. All users have read access to the following PRISM applications by default: (1) Distribution Permits 204, (2) Fee Lands 228, (3) Land Easements 212, (4) Land Leases 232, (5) Land Sales 208, (6) Master 220, and (7) Transmission Lines 216.

Users can be setup with write access for any of the consolidated PRISM applications. Users can be setup with special access such as: (1) setting up user maintenance access for Admin, (2) setting up a user as an agent in distribution permits, and (3) setting up a user for billing access in land leases. FIG. 16 illustrates an exemplary user permissions report.

Figure 3:
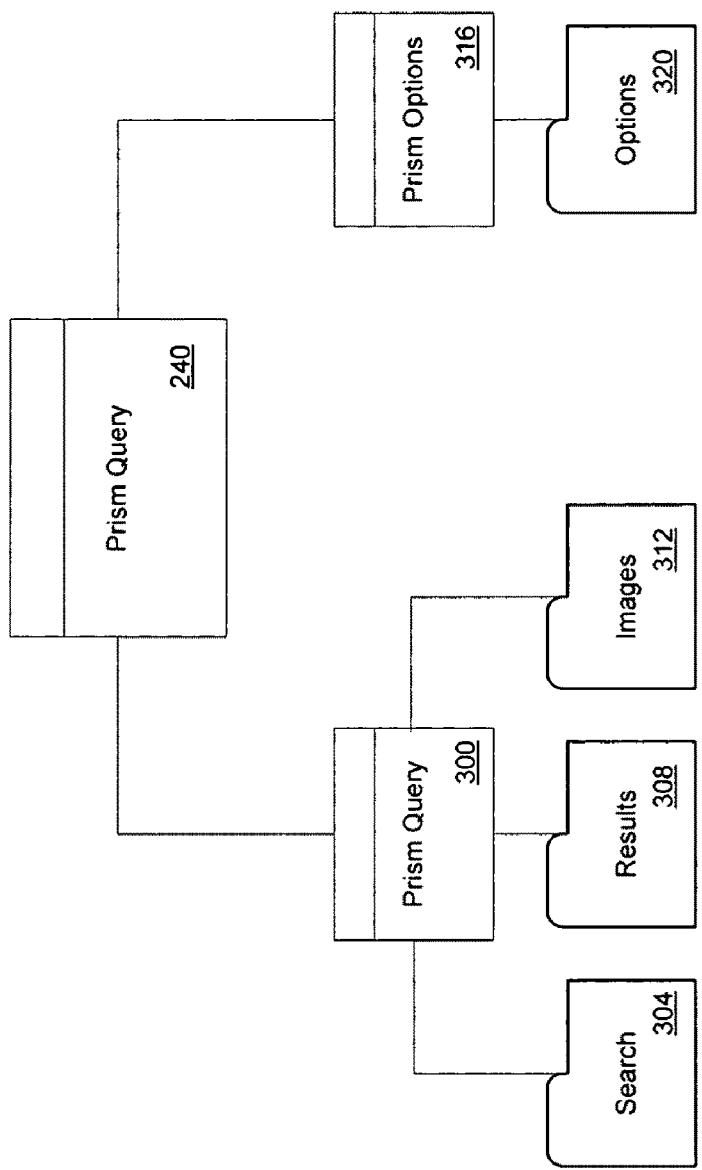
FIG. 3 illustrates an exemplary high level view of the Query application.

The purpose of the query application is to retrieve documents based on any number of attributes. FIG. 3 illustrates a high level view of the PRISM Query application 240 in an exemplary embodiment. The query application includes PRISM Query module 300 and PRISM Options module 316. The PRISM Query module 300 further includes Search sub-module 304, results sub-module 308 and Image sub-module 312. The PRISM Options module 316 includes Options sub-module 320. Due to the complexity of the PRISM system 200, the structure of the data model does not need to be known in order to use the query application 240. Instead, the query application 240 allows users to query all attribute data and manage the relationships without user knowledge of the structure of the database. The query application has two main interfaces-standard queries and advanced queries.

Figure 4:
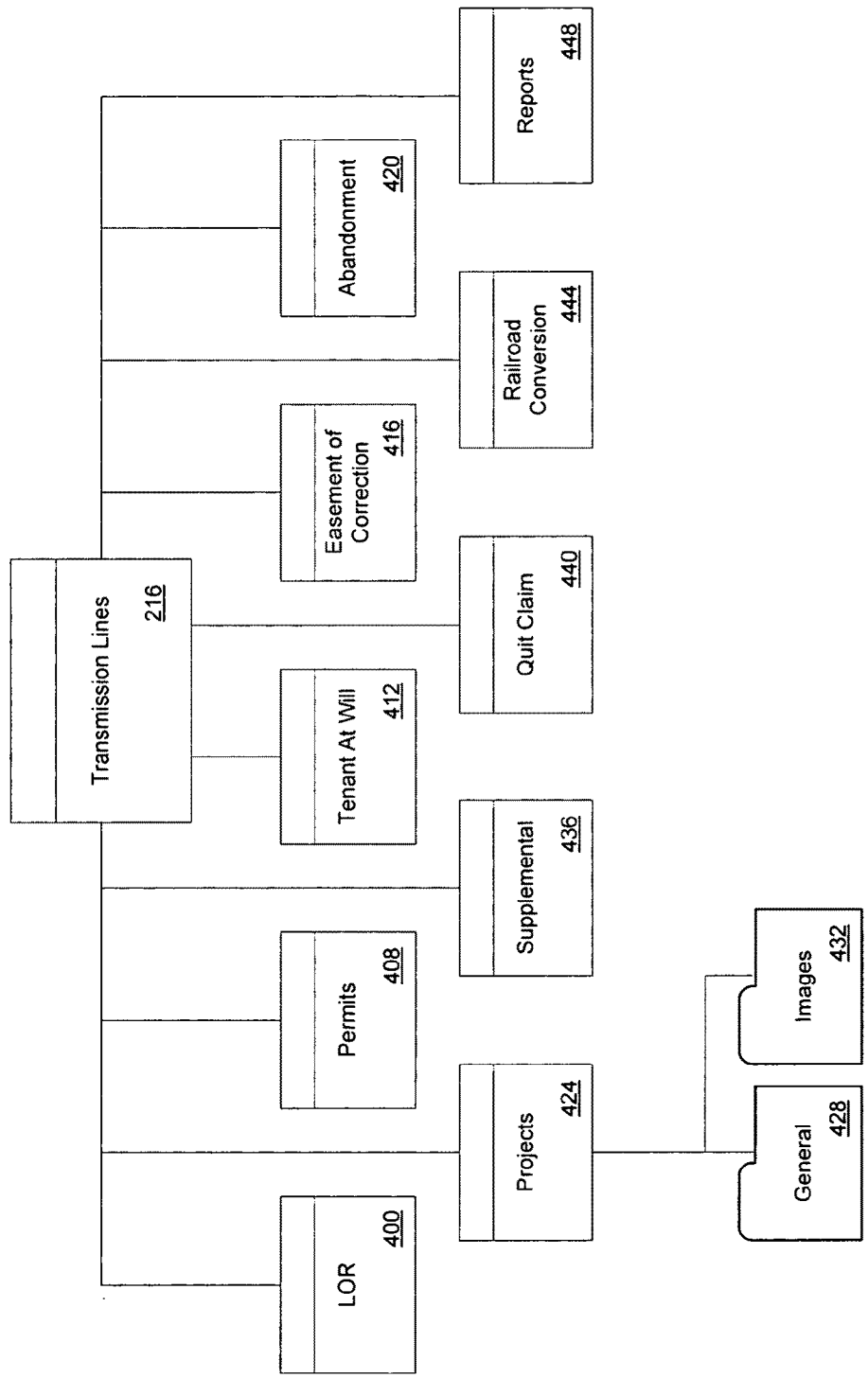
FIG. 4 illustrates an exemplary high level view of the Transmission Lines application.

Transmission lines are high voltage lines (greater than 44 kilovolts) used to transfer power over great distances. Due to the voltage levels of the lines, greater amounts of land are required for the safe distribution of power. Right of way documents pertaining to transmission lines typically grant rights to the utility typically ranging from fifty to two hundred feet in width. Given the amount of property being cleared for line erection, factors such as timber rights, hunting rights, mineral rights, etc. must be considered and maintained. FIG. 4 illustrates a high level view of the Transmission Lines application 216 in an exemplary embodiment. The Transmission Lines application includes, but is not limited to, the following modules: Letter of Request (LOR) 400, Permits 408, Tenant-at-Will 412, Easement of Correction 416, Abandonment 420, Projects 424, Supplemental 436, Quit claim 440, Railroad Conversion 444, and Reports 448.

Figure 5:
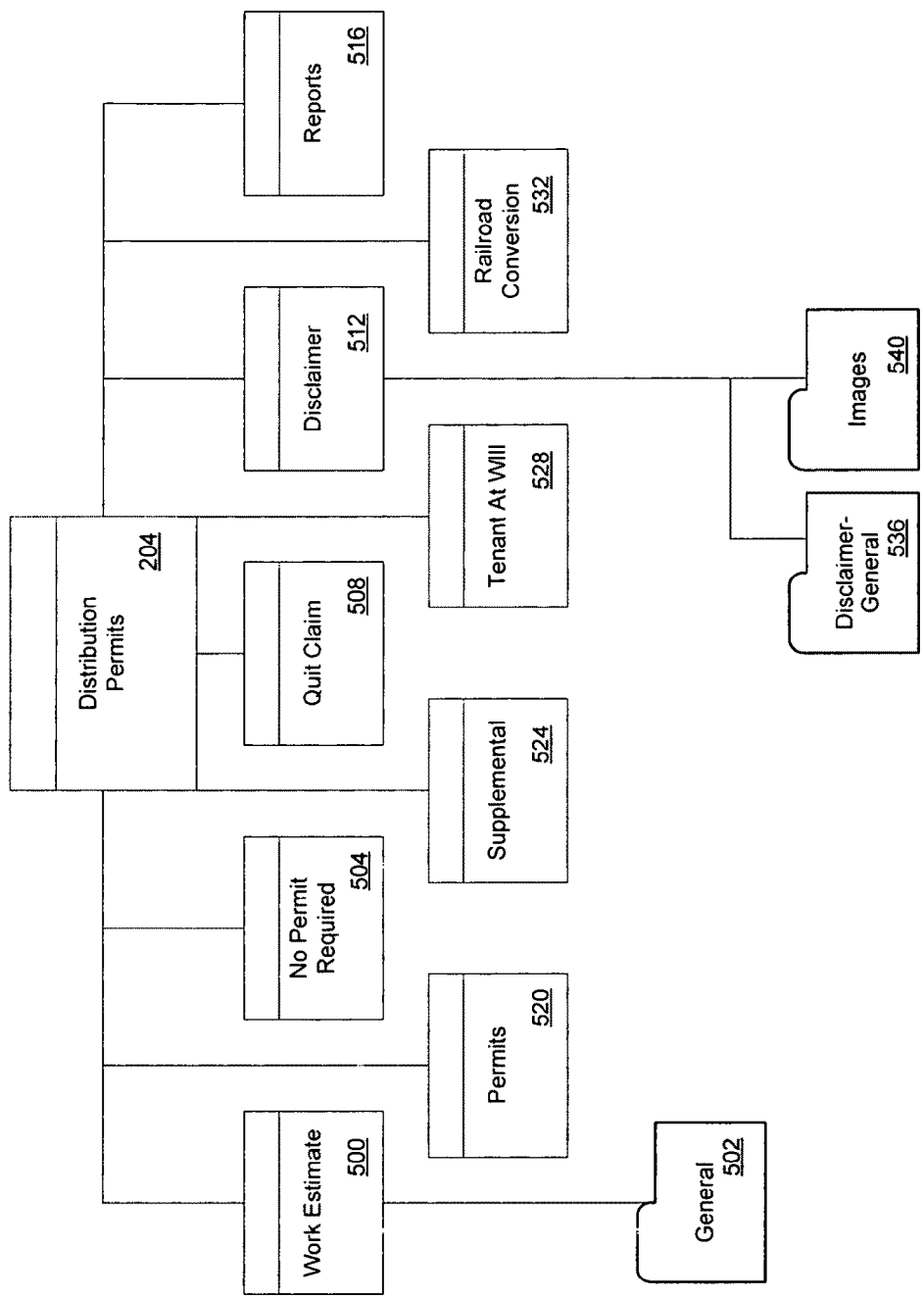
FIG. 5 illustrates an exemplary high level view of the Distribution Permits application.

Distribution permits constitute the bulk of documents maintained by the Corporate Real Estate division of a utility. Distribution permits generally include a rights page and an engineering sketch. The rights page contains the rights obtained by the utility and contains required signatures of the landowners and a representative of the utility. Rights typically include guy wires, tree trimming, pole erection, and general maintenance to existing distribution lines. The engineering sketch is a drawing of the actual line and work performed. FIG. 5 illustrates a high level view of the Distribution Permits application 204 in an exemplary embodiment. The Distribution Permits application 204 includes, but is not limited to, the following modules: Work Estimate 500, No Permit Required 504, Quit claim 508, Disclaimer 512, Reports 516, Permits 520, Supplemental 524, Tenant-at-Will 528, and Railroad Conversion 532. Disclaimer module 512 further includes Disclaimer-General sub-module 536, and Images sub-module 540.

Figure 6:
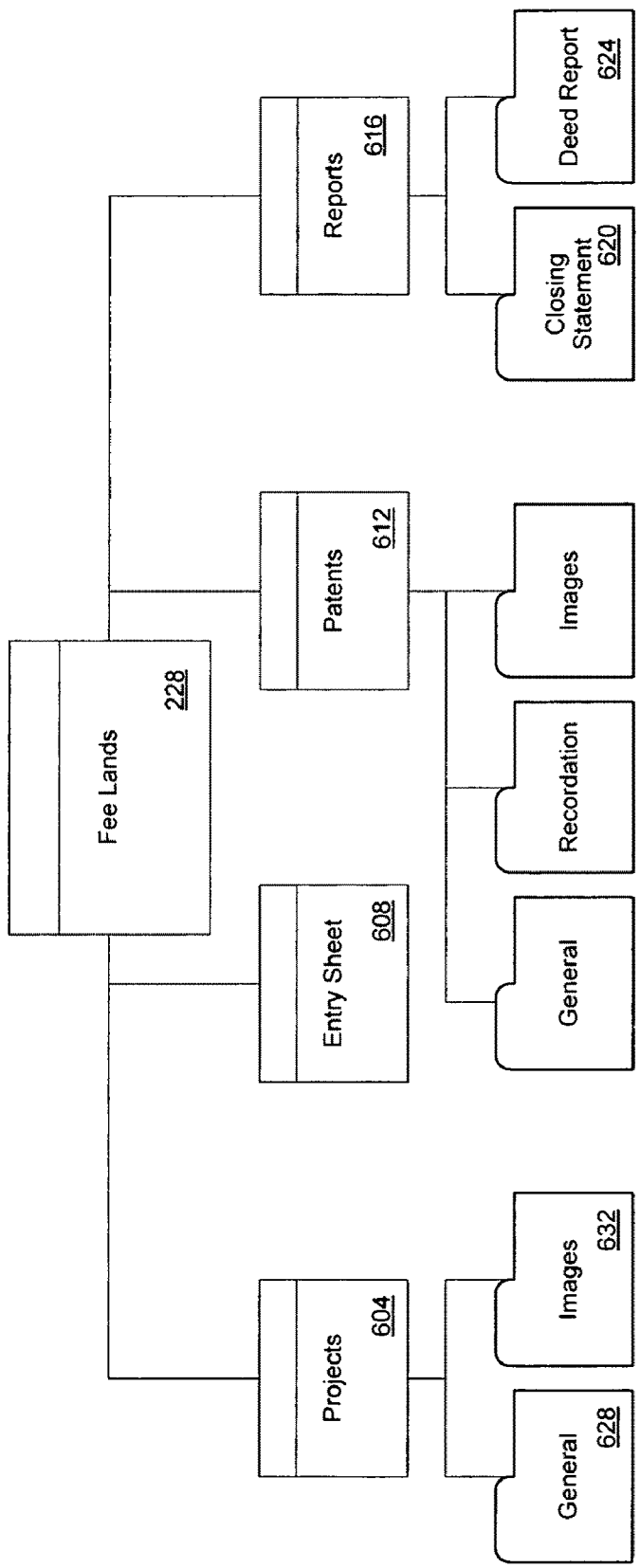
FIG. 6 illustrates an exemplary high level view of the Fee Lands application.

The Fee Lands application 228 maintains information pertaining to properties purchased by the utility. The utility purchases property for future use, power station development, growing trees, expansion, or any of several other reasons. When a piece of property is purchased, a deed is generated and recorded at the appropriate courthouse. Due to the nature of land purchase, factors such as compensation, secondary (other) compensation, and deed restrictions must be maintained. FIG. 6 illustrates a high level view of the Fee Lands application 228 in an exemplary embodiment. Fee Lands application 228 includes, but is not limited to, the following modules: Projects 604, Entry Sheet 608, Patents 612 and Reports 616. Projects module 604 includes General sub-module 628 and Images sub-module 632. Reports module 616 includes Deed sub-module 624 and Closing Statement sub-module 620.

Figure 7:
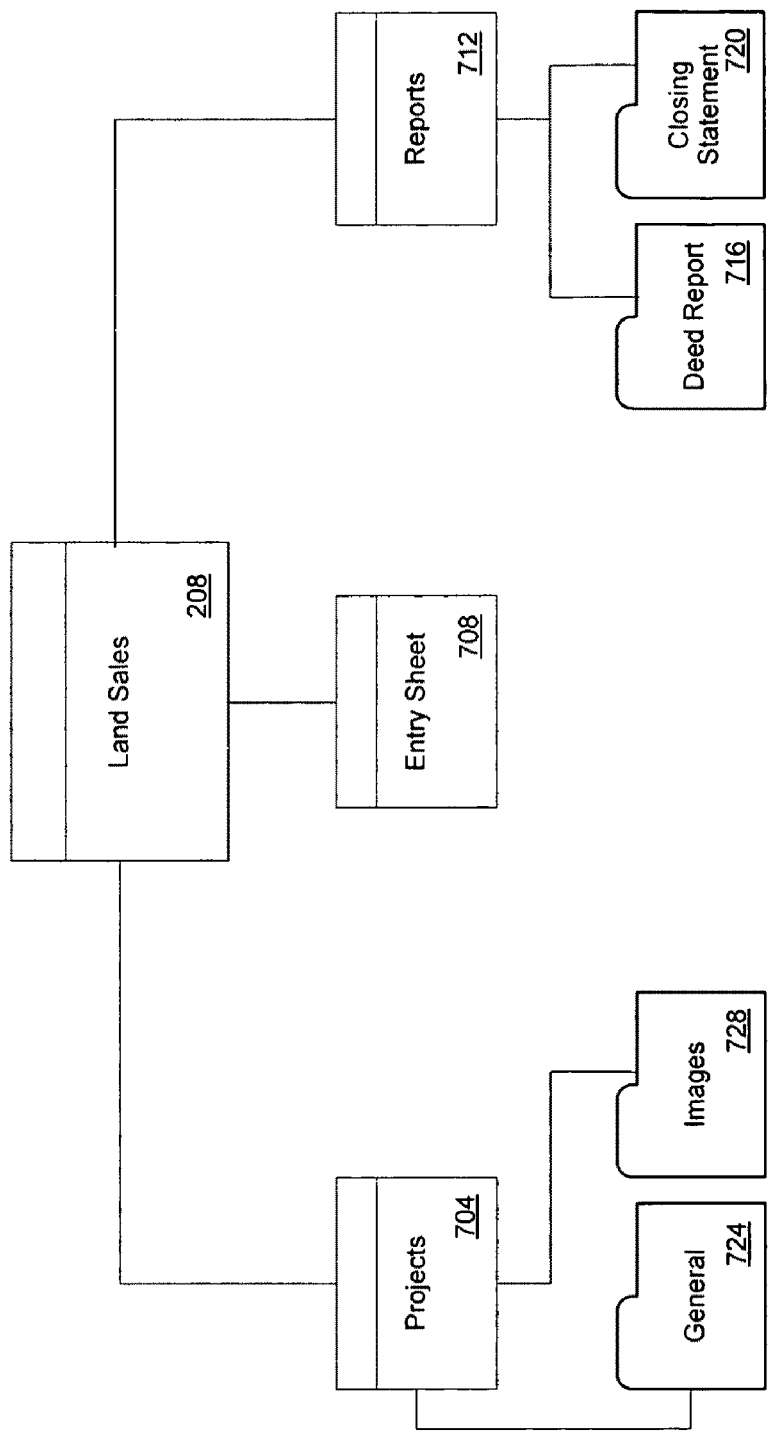
FIG. 7 illustrates an exemplary high level view of the Land Sales application.

The PRISM Land Sales application 208 maintains information pertaining to the utility's sale properties. The decision to sell a property may occur internally through CRE or externally through a customer inquiry. The utility would typically classify land sales into three categories: mineral, surface, or both. The application allows the user to track the cost for the sale of the property. Reports generated by the land sales module include a deed report and a closing statement. FIG. 7 illustrates a high level view of the Land Sales application 208 in an exemplary embodiment. Land Sales application 208 includes, but is not limited to, the following modules: Projects 704, Entry Sheet 708, and Reports 712. Projects module 704 includes General sub-module 724 and Images sub-module 728. Reports module 712 includes Deed sub-module 716 and Closing Statement sub-module 720.

Figure 8:
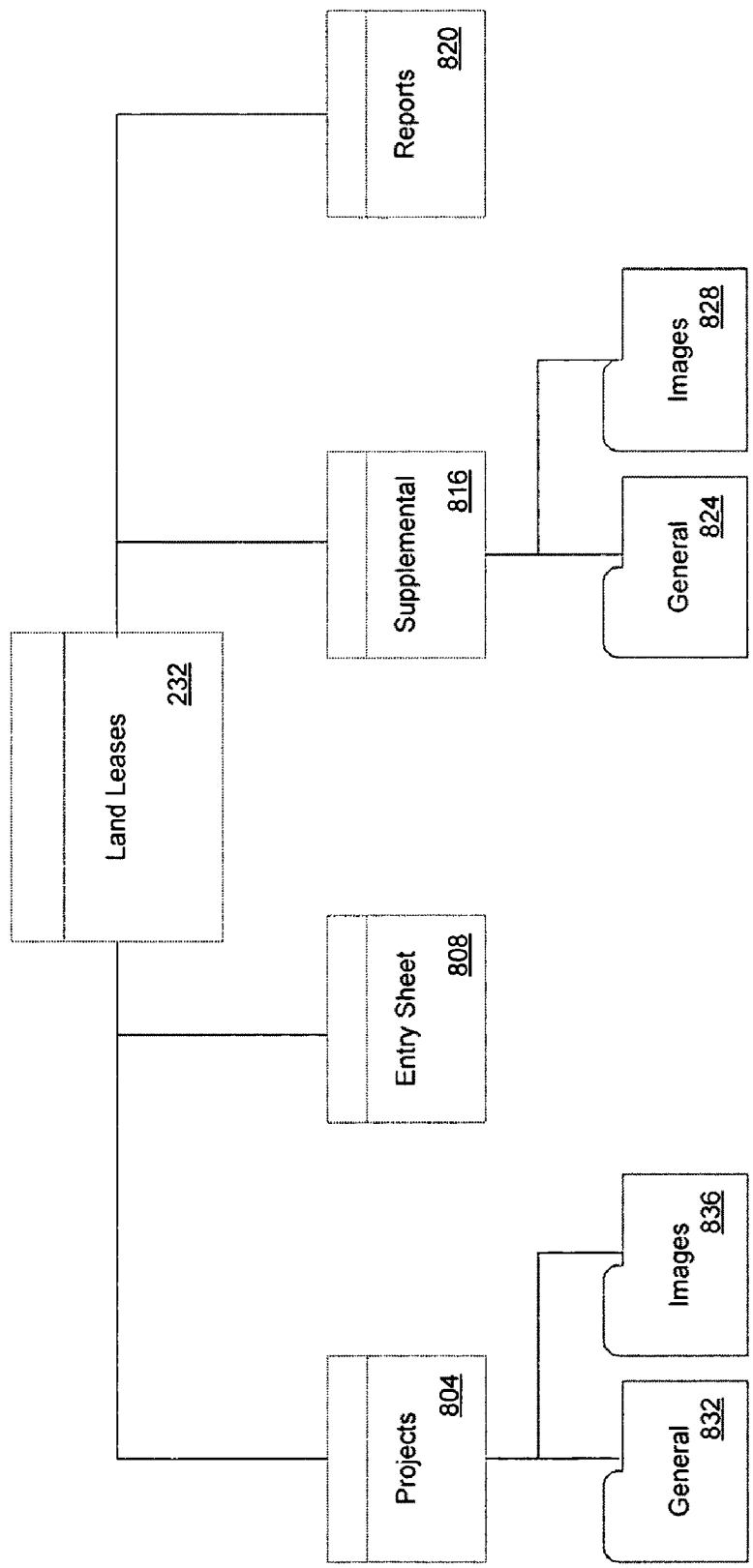
FIG. 8 illustrates an exemplary high level view of the Land Leases application.

The PRISM Land Leasing application 232 maintains information pertaining to the utility's lease properties. The decision to lease a property may occur internally through CRE or externally through a customer inquiry. The utility classifies leases into two categories: lake leases and non-lake leases. Lease terms can vary, and lease-billing frequency may be monthly, annually, quarterly, or semi-annually. Rent amount can be based on a Consumer Price Index (CPI) adjustment, rate escalation factor, or a negotiated value. Rent amount can also be determined by billing frequency and/or adjustment frequency. Reports generated by the land leasing module include a lease expiration report, rent calculation report, monthly revenue report, rent adjustment report, insurance expiration report, and tax exemption report. FIG. 8 illustrates a high level view of the Land Leases application 232 in an exemplary embodiment. Land Leases application 232 includes, but is not limited to, the following modules: Projects 804, Entry Sheet 808, Supplemental 816, and Reports 820. Projects module 804 includes General sub-module 832 and Images sub-module 836. Supplemental module 816 includes General sub-module 824 and Images sub-module 828.

Figure 9:
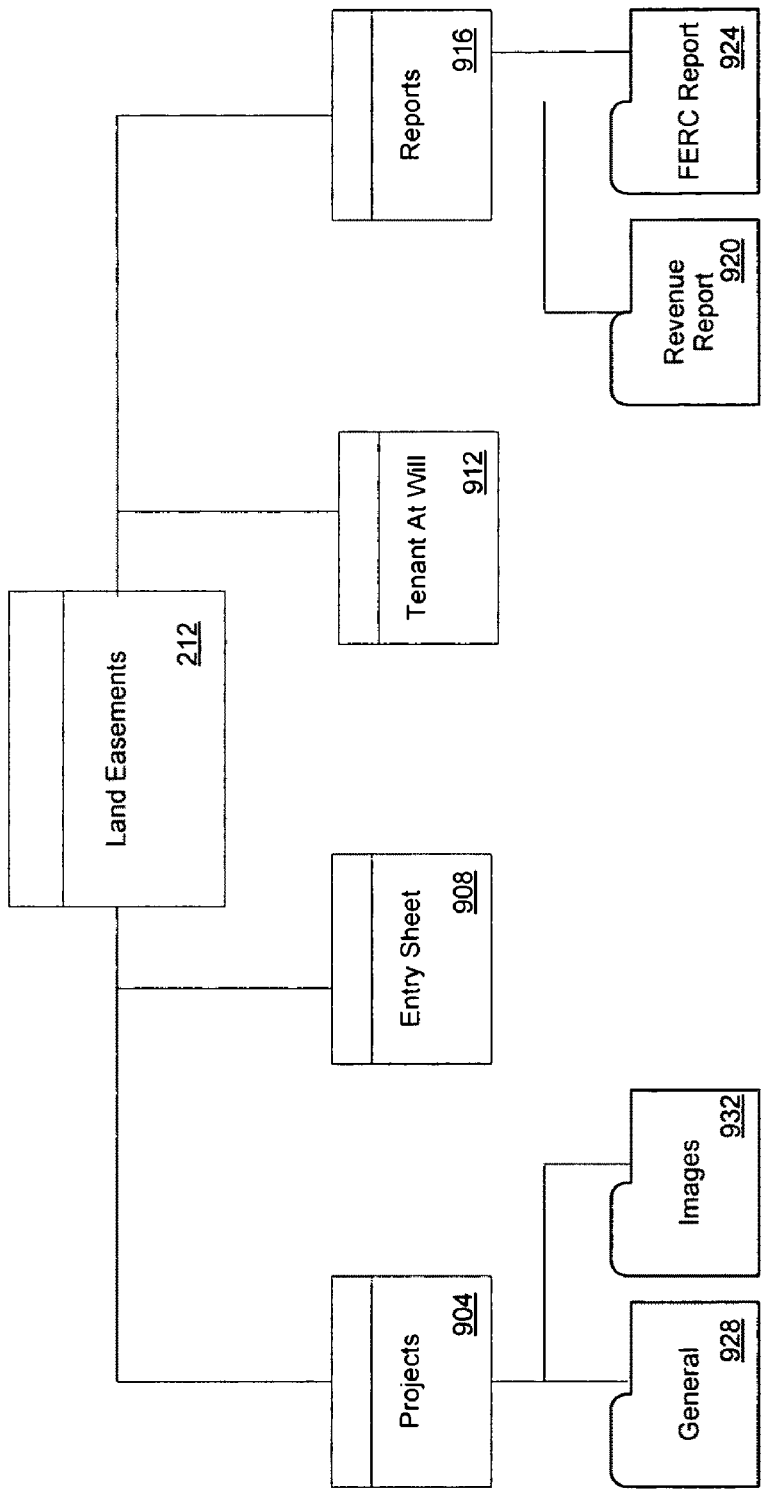
FIG. 9 illustrates an exemplary high level view of the Land Easement application.

The Land Easements application 212 maintains information pertaining to properties eased by the utility. A land easement document gives a grantee limited access to a piece of property owned by the utility. The utility retains full ownership of eased properties and is only subject to the limitations imposed by the easement agreement. In the case of a land easement, the utility must maintain specific information related to rights and crossing access. Reports generated by the land easement application include a Federal Energy Regulatory Commission (FERC) report and monthly revenue report. FIG. 9 illustrates a high level view of the Land Easement application 216 in an exemplary embodiment. Land Easements application 212 includes, but is not limited to, the following modules: Projects 904, Entry Sheet 908, Tenant At Will 912, and Reports 916. Projects module 904 includes General sub-module 928 and Images sub-module 932. Tenant At Will module 912 includes Revenue Report sub-module 920 and FERC Report sub-module 828.

The state Tax Commission maintains property valuation records for all lands owned by public utilities across a state. Usually organized by county, these records allow the Tax Commission to proportion and distribute a utility's statewide tax payment on a per county basis. For example, a railroad company with large land holdings pays taxes annually based on total area of land holdings in the state. The Tax Commission uses the railroad's property valuation records to determine the pro rata distribution of taxes to each county. The PRISM Public Utility Assessment (PUA) application 244 maintains utility land location and area information in order to facilitate reporting and verification with the Tax Commission.

Master documents 220 represent agreements between the utility and other large utility/railroad organizations throughout the state. Master agreements grant rights to cross distribution facilities of other organizations and are typically statewide. Supplemental agreements reference the master agreement and contain detailed information about specific crossings. Some master agreements grant permissions both ways giving the utility the right to cross the distribution facilities of another organization and giving that organization the right to cross the distribution facilities of the utility. The Links application 224 allows users to access other PRISM-related applications and support.

Figure 10:
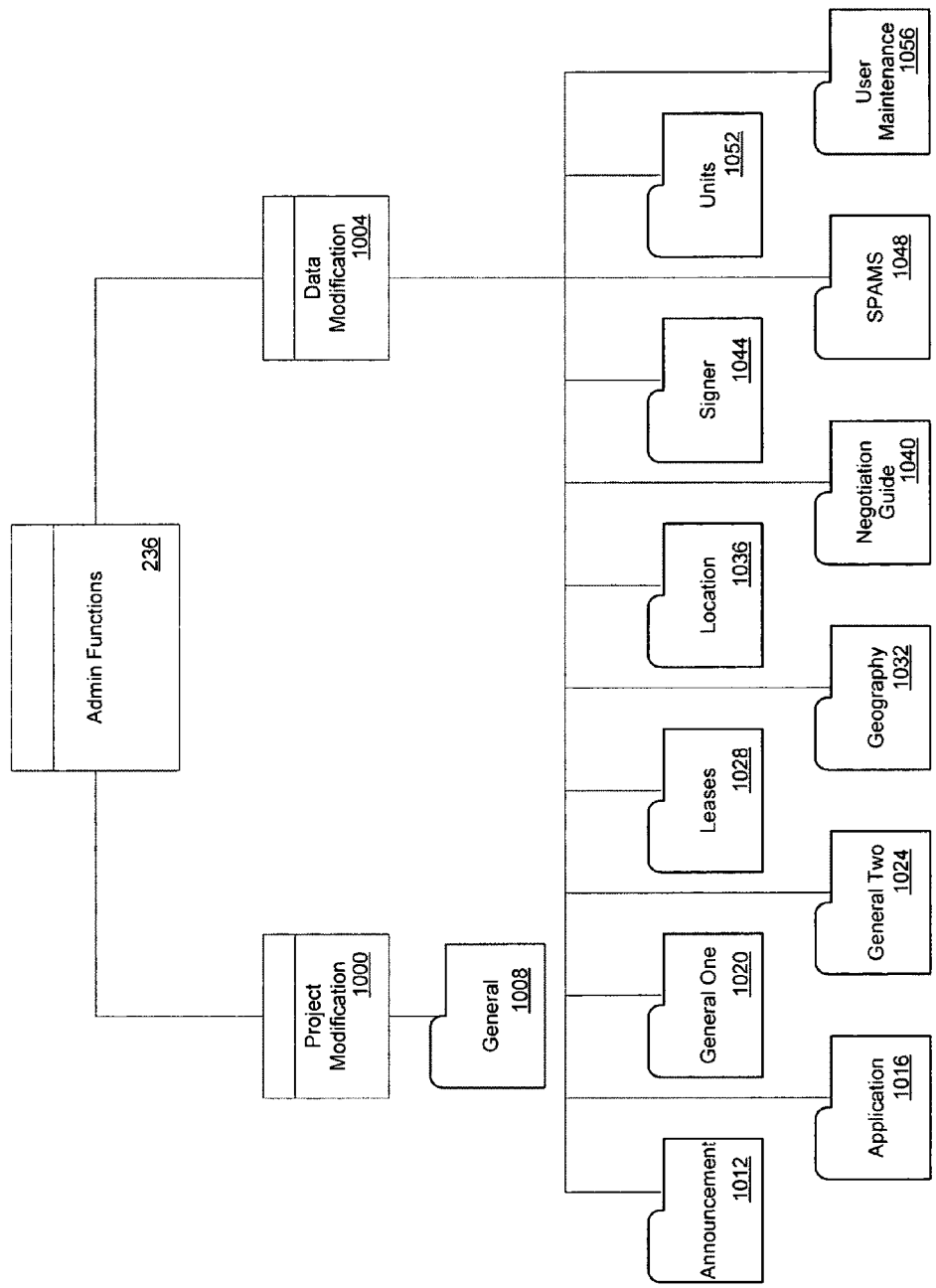
FIG. 10 illustrates an exemplary high level view of the Admin Functions application.

The Admin Functions application 236 allows a user to perform administrative actions such as adding, modifying, and deleting PRISM data types and managing email templates and announcements. FIG. 10 illustrates a high level view of the Admin Functions application 236 in an exemplary embodiment. Admin Functions application 236 includes Project Modification module 1000 and Data Modification module 1004. Project Modification module 1000 includes general sub-module 1008. Data Modification module 1004 includes the following sub-modules: Announcement 1012, Application 1016, General One 1020, General Two 1024, Leases 1028, Geography 1032, Location 1036, Negotiation Guide 1040, Signer 1044, Shoreline Permitting and Management System (SPAMS) 1048, Units 1052, and Use Maintenance 1056.

Figure 11:
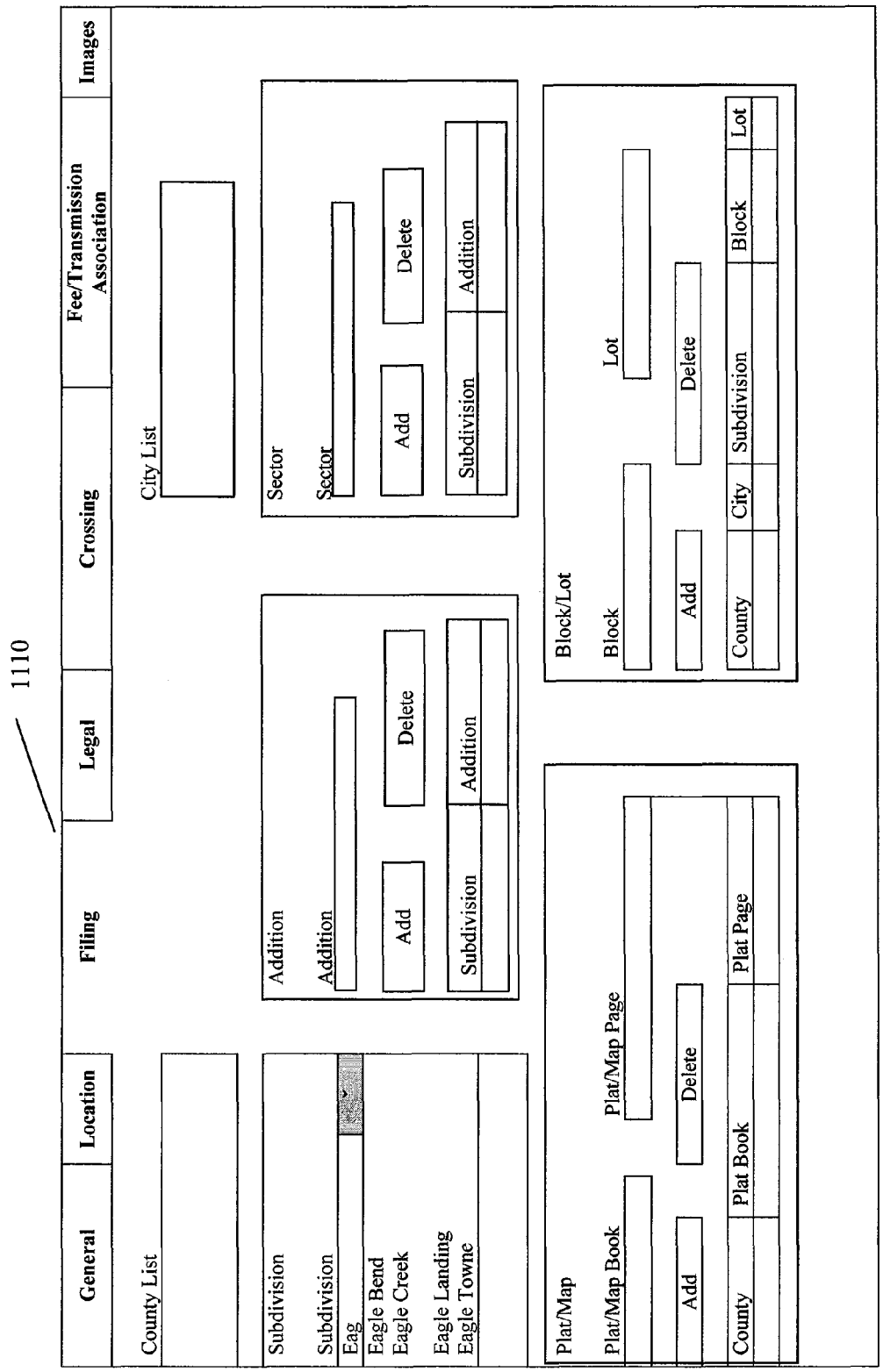
FIG. 11 illustrates an exemplary PRISM user interface that incorporates IntelliSense search functionality.

The consolidated PRISM user interface can display a page header on every page that includes the PRISM and utility company logos. An exemplary user interface is illustrated in FIG. 11. Below this header, the consolidated PRISM application 200 displays a top-level menu 1110 on all web pages, which allows navigation to each application included within the solution.

List Grids are available throughout the consolidated PRISM application to allow the user to add, update, and delete data within the consolidated PRISM application. The application does not write the contents of the data grid to the database until the user clicks the "save" button, thus allowing the user to verify the data prior to the application saving the data.

In one embodiment, the PRISM application uses IntelliSense drop down list functionality to present users with a more robust search capability. IntelliSense is a third party vendor product feature that reads internal metadata and provides a list of available objects and properties during software development. For example, it is a feature of SQL Prompt, which is available from Red Gate Software Limited. FIG. 11 illustrates an exemplary PRISM user interface that incorporates IntelliSense search functionality. The user can search for data in an IntelliSense field by inputting the first three or more letters of the item the user is searching for; all items that contain that letter combination appear in the drop down list. The drop down list marked "A" in FIG. 11 is an example use of this feature.

An exemplary PRISM Query search screen is illustrated in FIG. 12. The user must build the query before the query can be executed. Building the query is simply a matter of setting values for the desired fields.

The application displays the results of the executed query on the Query Results screen. An exemplary Results screen is illustrated in FIG. 13. Users may sort the results or reorder result columns. Users will have the ability to filter the data in the results data grid 1310 by using filter options contained in a section below the grid. Each filter will only apply to the current data, not the original result set, meaning filters will stack. After selecting a row in the results data grid, users will have the ability to view all of the images assigned to the selected document, view all of the images assigned to the documents associated with the selected document, and view all of the images assigned to documents within the selected document's project.

Users are able to set and save the output fields for the user-defined queries they create. Users can add or remove any of the available fields except for the Parcel Number field. This field must always be included as an output field.

Transmission Lines

With further reference to FIG. 4, the PRISM Transmission Lines application 216 is described below in greater detail. A Letter of Request (LOR) 400 is a document delivered to Corporate Real Estate by the Power Delivery division of a utility. The Letter of Request 400 contains information pertaining to a transmission line and is the instrument that initiates right of way acquisition for the development of the line. The letter of request is accompanied by a drawing that graphically displays the centerline location of the Transmission Line. From the drawing and the Letter of Request, a preliminary set of potential landowners is drawn and the acquisition of right of way is started.

The Project module 424 of the Transmission Lines application 216 allows the user to perform project level actions. The user may select an existing transmission lines project to view permits associated with the project. The user may then choose to open, duplicate, or remove a selected permit. This module will also display all images (via sub-module 432) associated with a specified project.

Figure 14:
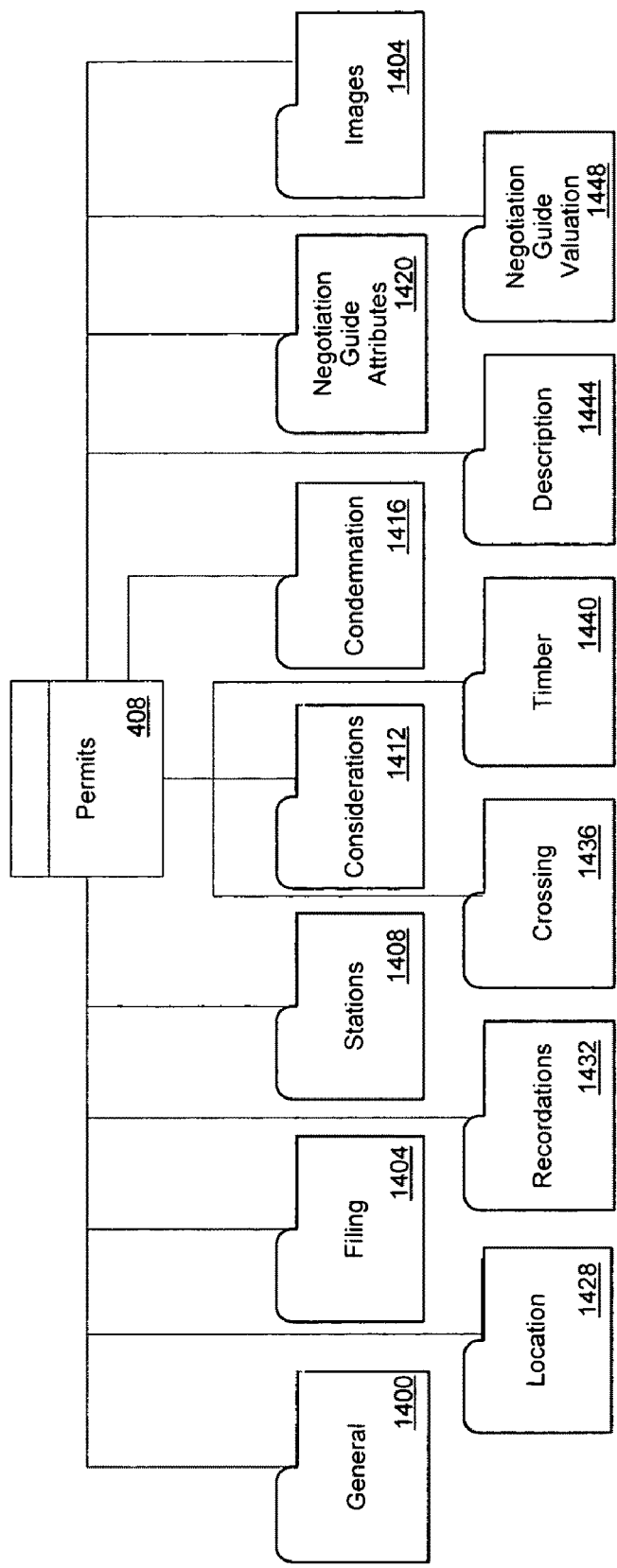
FIG. 14 illustrates the screen tabs for the Permits module of the Transmission Lines application.

The Permits module 408 of the Transmission Lines application 216 allows the user to add, modify, and delete all permit specific information. The user may navigate to this module by clicking on the Transmission Lines navigation tab and then the Permits tab. FIG. 14 illustrates the sub-module pages for the Permits module. The creation of the corresponding user interface pages for each of the sub-modules pages is within the capabilities of one of ordinary skill in the art and is not included here.

The Permits—General page 1400 is the default entry page for the Permits module 408.

The user can access the Filing page 1404 to enter filing data such as subdivision, addition, sector, plat/map information associated with a Permits request in a transmission lines project. The user can access the Recordations page 1432 to enter recordation data associated with a Permits request in a transmission lines project. The user can access the Stations page 1408 to enter station data associated with a Permits request in a transmission lines project. The user can access the Crossing page 1436 to enter crossing data associated with a Permits request in a transmission lines project. The user can access the Considerations page 1416 to enter payment data associated with a Permits request in a transmission lines project. The user can access the Timber page 1440 to enter timber data associated with a Permits request in a transmission lines project.

The user can access the Condemnation page 1416 to enter condemnation data associated with a Permits request in a transmission lines project. Condemnation documents represent situations where landowners refuse to grant permission to the utility for a transmission lines. In these cases, the utility has the option to purchase or condemn the property. Condemnation is typically a last resort resulting in the utility taking ownership of property through the right of eminent domain. A confirmed pleading is received by the Corporate Real Estate division of the utility and contains all information pertaining to each piece of land condemned.

The user can access the Description page 1444 to enter permit title and legal description information associated with a Permits request in a transmission lines project.

The user can access the Negotiation Guide Attributes page 1420 by clicking the "Negotiation Guide Attributes" button. The user can access the Negotiation Guide Valuation page 1448 by clicking the "Negotiation Guide Valuation" button. Both pages use the Negotiations Guide. The Negotiation Guide is a document containing information related to the actual pieces of land associated with a transmission line. The information contained ranges from potential owner(s) to timber value. The Negotiation Guide is a document including information for negotiating with landowners for the acquisition of right of way. Typically, the landowners contained in the Negotiation Guide are inaccurate and must be updated as the field agents obtain accurate records as to land sales, land inheritance, and proper land boundaries. In general, the Negotiation Guide is the starting point for the purchase of rights by the utility toward the construction of a transmission line.

The user can access the Images page 1424 to add and view images associated with a Permits request in a transmission lines project.

Supplemental module 436 of the Transmission Lines application 216 provides access to master/supplemental documents. Master/Supplemental documents represent agreements between the utility and other large utility/railroad organizations throughout the state. Master agreements grant rights to cross distribution facilities of other organizations and are typically statewide. Supplemental agreements reference the master agreement and contain detailed information about specific crossings. Some master agreements grant permissions both ways, giving the utility the right to cross the distribution facilities of another organization and giving that organization the right to cross the distribution facilities of the utility.

Tenant at Will module 412 of the Transmission Lines application 216 provides access to tenant-at-will documents. Tenant at Will documents grant landowners the right to encroach on lands to which the utility has obtained rights. With respect to transmission lines, landowners typically want to use the property for growing trees, ingress, or egress. These documents typically contain an authorization sheet signed by a representative of the utility.

Quit Claim module 440 of the Transmission Lines application 216 provides access to quit claim documents. Quit Claim documents revoke all rights to lands previously granted to a utility. Quit Claim documents, with respect to transmission lines, are typically issued when the transmission line is being re-routed due to any of a number of reasons. A Quit Claim document will have a reference to a prior document that granted rights to the utility.

Easement of Correction module 416 of the Transmission Lines application 216 provides access to easement of correction documents. Easement of Correction documents are generally issued to correct the legal description of a parcel of land for which the utility has obtained rights. Once a permit has been signed, all changes require a separate supporting document. Easement of Correction documents are recorded at the courthouse of the county in which the property is located. An Easement of Correction document must reference the previously obtained permit.

The user can access the Railroad Conversion module 444 to access railroad license documents. Railroad license documents represent agreements between the utility and a railroad organization that grants the utility or one of its entities crossing rights to a particular railroad. Railroad licenses generally consist of a rights document and a map and contain specific information about payments and voltage or size of a crossing.

Distribution Permits

With further reference to FIG. 5, the PRISM Distribution Permits application 204 will be described in greater detail. The user can access the Work Estimate module 500 to access General page 502 to enter a work estimate in the consolidated PRISM Application.

Figure 15:
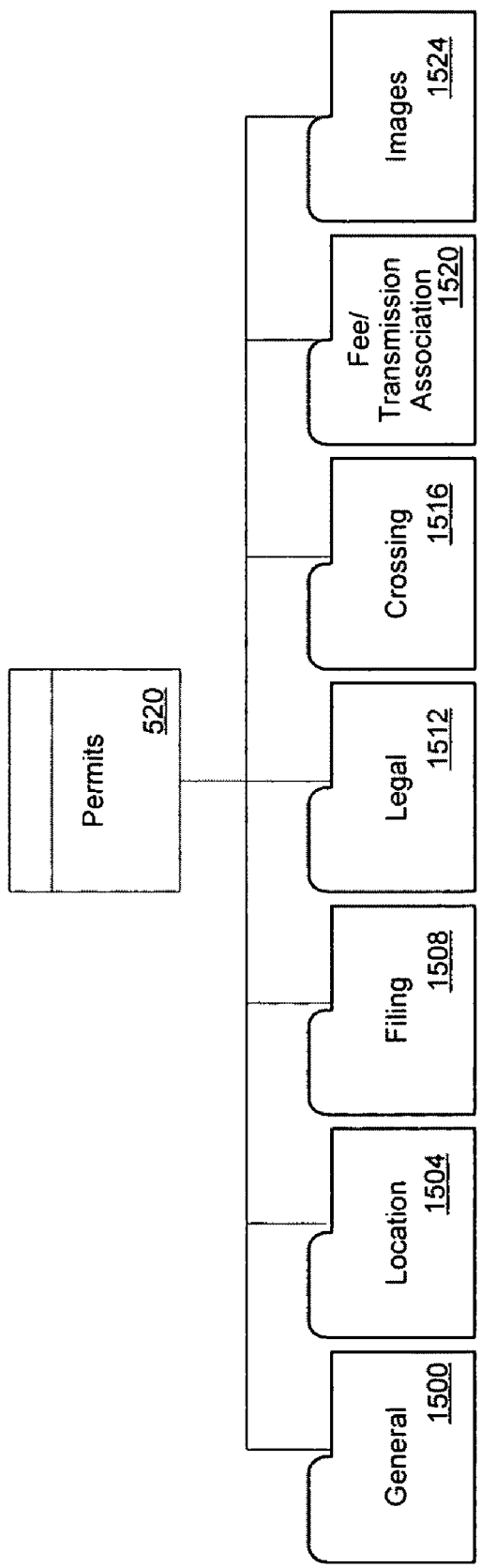
FIG. 15 illustrates the screen tabs for the Permits module of the Distribution Permits application.

The Permits module 520 of the Distribution Permits application 204 allows the user to add, modify, and delete all permit specific information. The user may navigate to this module by clicking on the Distribution Permits navigation tab and then the Permits tab. FIG. 15 illustrates the sub-module pages for the Permits module. The creation of the corresponding user interface pages for each of the sub-modules pages is within the capabilities of one of ordinary skill in the art and is not included here.

The user can access the Location page 1504 to enter location data associated with a parcel in a Distribution Permits project. The user can access the Filing page 1508 to enter filing data such as subdivision, addition, sector, plat/map information associated with a parcel in a Distribution Permits Project. The user can access the Crossing page 1516 to enter crossing data associated with a parcel in a Distribution Permits project. The user can access the Image page 1524 to add and view image data associated with a parcel in a Distribution Permits project.

The No Permit Required module 504 of the Distribution Permits application 204 allows the user to store and retrieve no permit required documents. No permit required documents represent situations where the utility has begun work on distribution facilities and canceled the job for any of a number of reasons. Typically, a sketch has been drawn displaying the location and specifics of the line to be built. After completing the drawing, the job is canceled, leaving just the documents to be maintained. However, sometimes the utility completes the job prior to acquisition of a right of way. In these cases, landowners grant permission verbally, or no permission has been obtained. In either case, the work sketches must be maintained by the CRE division of the utility.

The user can access a General page to enter general data associated with a "No Permit Required" parcel in a Distribution Permits project. The user can access a Location page to enter location data associated with a "No Permit Required" parcel in a Distribution Permits project. The user can access an Images page to enter image data associated with a "No Permit Required" parcel in a Distribution Permits project.

Supplemental module 524 of the Distribution Permits application 204 provides access to master/supplemental documents. Master/Supplemental documents represent agreements between the utility and other large utility/railroad organizations throughout the state. Master agreements grant rights to cross distribution facilities of other organizations and are typically statewide. Supplemental agreements reference the master agreement and contain detailed information about specific crossings. Some master agreements grant permissions both ways, giving the utility the right to cross the distribution facilities of another organization and giving that organization the right to cross the distribution facilities of the utility.

The Quit Claim module 508 to allow the user to access quit claim documents. Quit claim documents revoke all rights to lands previously granted to the utility. Quit claim documents are typically issued when the distribution facilities are being removed from a landowner's property. A quit claim document will have a reference to a prior document that granted rights to the utility.

The Tenant At Will module 528 allows the user to access tenant-at-will documents. Tenant at Will documents grant landowners the right to encroach on lands, for which the utility has obtained rights. Typically, a landowner wishes to use an easement for personal reasons and is required to obtain authorization from the utility. These documents typically contain an authorization sheet signed by a representative of the utility.

The Disclaimer module 512 allows the user to access disclaimer documents. Disclaimer documents state that no further work will be done with respect to distribution lines contained within a landowner's property. Typically, landowners must obtain a disclaimer from the utility in order to clear the title of the property to complete a land sale. Disclaimer documents reference an existing document and must be maintained within the CRE division to eliminate the possibilities of performing work on lands for which rights have been disclaimed.

The user can access the Disclaimer-General page 536 to setup base data associated with a disclaimer parcel in a Distribution Permits project. The user can access the Disclaimer-Image page 540 to view image data associated with a disclaimer in a Distribution Permits project.

The user can access the Railroad Conversion module 532 to access railroad license documents. Railroad license documents represent agreements between the utility and a railroad organization that grant the utility, or one of its entities, crossing rights to a particular railroad. Railroad licenses generally consist of a rights document and a map and contain specific information about payments and voltage or size of a crossing.

Fee Lands

The Fee Lands application 228 maintains information pertaining to properties purchased by the utility. The utility purchases property for future use, power station development, growing trees, expansion, or any of several other reasons. When a piece of property is purchased, a deed is generated and recorded at the appropriate courthouse. Due to the nature of land purchase, factors such as compensation, secondary compensation, and deed restrictions must be maintained. Reports generated by the Fee Lands application 228 in an exemplary embodiment include a deed report and a closing statement.

With further reference to FIG. 6, the user can access the General page in the Fee Land Project module 604 to create a new fee land project or to update project information associated with an existing fee land project. The user can access the Images page to add or remove images for a new or existing fee land project. The user can access the General page under the Entry Sheet tab 608 to add and update parcel information for an existing fee land project. The user can access the Signer page under the Entry Sheet tab 608 to enter grantor and grantee data associated with a fee land parcel. The user can access the Location page under the Entry Sheet tab 608 to enter location data associated with a parcel in a fee land project.

The user can access the Filing page under the Entry Sheet tab 608 to enter subdivision, addition, sector, block, lot, plat/map book, and plat/map page data associated with parcels in a fee land project. The user can access the Legal Description page under the Entry Sheet tab 608 to enter description data associated with parcels in a fee land project. The user can access the Land Info page under the Entry Sheet tab 608 to include interest acquired, land classification, and land patents.

The user can access the Consideration Types page under the Entry Sheet tab 608 to enter payment information associated with the parcel. The user can access the Agent Activity page under the Entry Sheet tab 608 to enter information associated with the agents who handled the parcel.

The user can access the Recordation page under the Entry Sheet tab 608 to enter recordation information associated with the land parcel. The user can access the Images page under the Entry Sheet tab 608 to add images to a new or existing fee land project.

Land Sales

The PRISM Land Sales application 208 maintains information pertaining to the utility's sale properties. The decision to sell a property may occur internally through CRE or externally through a customer inquiry. Utility sales can be classified into four categories: mineral, surface, both, or neither. The application allows the user to track the cost for the sale of the property. Reports generated by the Land Sales application 208 in an exemplary embodiment include a deed report and a closing statement.

With further reference to FIG. 7, the user can use the Projects module 704 of the Land Sales application 208 to view information associated with an existing land sales project. The user can access the General page to view information such as drawing information, General Work Order (GWO) Numbers, Plant Account Number, and Location Numbers associated with an existing land sales project. GWO numbers include a project number and identifier for capital projects. The user can use the Images page to add and view images for a land sales project.

The user can use the Entry Sheet module 708 of Land Sales application 208 to create a land sales project based upon an existing project and update information associated with an existing land sales project. The user can use the Signer page under the Entry Sheet tab 708 to enter signer data associated with a land sales project. The user can use the Location page under the Entry Sheet tab 708 to enter location data associated with a parcel in a land sales project. The user can use the Land Info page to enter land data associated with a parcel in a land sales project. The user can use the Description page under the Entry Sheet tab 708 to enter description data associated with parcels in a land sales project. The user can use the Recordation page to enter recordation information associated with the parcel. The user can use the Agent page under the Entry Sheet tab 708 to enter the agent responsible for the land sales project. The user can use the Images page under the Entry Sheet tab 708 to add images to a land sales project.

Land Leasing

The PRISM Land Leasing application 232 maintains information pertaining to the utility's lease properties. The decision to lease a property may occur internally through CRE or externally through a customer inquiry. Lease terms can vary, and lease-billing frequency may be monthly, annually, quarterly, or semi-annually. Rent amount can be based on a Consumer Price Index (CPI) adjustment, rate escalation factor, or a negotiated value. Rent amount can also be determined by billing frequency and/or adjustment frequency. Reports generated by the Land Leasing application 232 in an exemplary embodiment can include a lease expiration report, rent calculation report, monthly revenue report, rent adjustment report, insurance expiration report, and tax exemption report.

With further reference to FIG. 8, the user can use the Projects module 804 of the Land Leases application 232 to view information associated with an existing land lease project. The user can use the General page under the Projects module 804 to view information such as drawing information, General Work Order (GWO) Numbers, Plant Account Number, and Location Numbers associated with an existing land lease project. The user can use the Images page under the Projects module 804 to view and add images to a land lease project. The user can use the Entry Sheet module 808 of the Land Leases application 232 to enter data associated with a land lease project.

Land Easements

The PRISM Land Easements application 212 maintains information pertaining to properties eased by the utility. A land easement document gives a grantee limited access to a piece of property owned by the utility. The utility retains full ownership of eased properties and is only subject to the limitations imposed by the easement agreement. In the case of a land easement, specific information related to rights and crossing access must be maintained. Reports generated by the Land Easements application 212 include a Federal Energy Regulatory Committee (FERC) report and monthly revenue report.

With further reference to FIG. 9, the user can use the Projects module 904 of Land Easements application 212 to view information associated with an existing land easement project. The user can use the General page under the Projects module 904 to view information such as drawing information, GWO Numbers, Plant Account Number, and Location Numbers associated with an existing land easement project. The user can use the Entry Sheet module the Projects module 904 of Land Easement application 212 to add information associated with an existing land easement project.

Admin Functions

The Admin Functions application 236 of the consolidated PRISM application 200 allows a user to perform administrative actions such as adding, modifying, and deleting PRISM data types and managing email templates and announcements. New/Edit/Delete operations are available on drop down lists in the Admin Functions application 236. This allows the user to add, edit, and delete the data contained within the drop down lists. Reports generated by the Admin Functions application 236 in an exemplary embodiment can include a PRISM permission report containing user application access and user query access to the various applications integrated into PRISM. FIG. 16 illustrates an exemplary user permissions report.

With further reference to FIG. 10, the Project Modification 1000 and Data Modification 1004 modules of Admin Functions application 236 allows users to perform administrative action on projects and parcels within the PRISM application. These actions include editing project/parcel names, deleting projects/parcels, and adding, reassigning, or removing a project-parcel association. The modify announcement sub-module 1012 allows users to add, update, and delete announcements that are displayed within the PRISM application. The modify application data sub-module 1016 allows users to add, update, and delete recordation types and drawing types associated with a selected application. This sub-module also allows the user to add, update, and delete rights, conveyance types, permit types, kinds of instruments, and image types for a selected document type.

The modify general data sub-module 1020 allows users to add, update, and delete agent, author, crossing, and drawing company information. The modify general 2 data sub-module 1024 allows users to modify the work estimate mask, and add, update, and delete document and image path information, fee land types, deed restrictions, interest acquired, land classification, and subdivisions. The modify leases data sub-module 1028 allows users to add, update, and delete reservoirs, FERC numbers, closing cost descriptions, revenue types, insurance companies, lease status, CPI schedules, and lease billing information.

The modify geography data sub-module 1032 allows users to add, update, and delete country, state, city, county, and courthouse information. The modify location data sub-module 1036 allows users to add, update, and delete sections, townships, ranges, and divisions. This sub-module also allows users to add, modify, and delete county-STR (section, township, range) and county-division combinations.

The modify negotiations guide data sub-module 1040 allows users to add and update timber information, highest and best use information, improvement types, ownership determination types, and neighborhood types. The land appraisal can be based on the highest and best use of the land, e.g., timber, agriculture value, etc. The modify signer data sub-module 1044 allows users to add, update, and delete signer rights, roles, status, and types as well as phone, draft, and organization information.

The manage emails sub-module allows users to manage email templates for the fee land closeout email and the lease insurance expiration email. A fee land closeout email is sent when the user clicks the Send Closeout Email button in the Fee Lands module. A lease insurance expiration email is sent automatically 30 days prior to the expiration of the lease insurance. An automated process runs on a nightly basis to determine if there are leases set to expire in 30 days, and then sends the email notification automatically. The User Maintenance sub-module 1056 allows users to add, update, and delete users and PRISM application access for a selected user.

Embodiments of the invention have been described as computer-implemented processes. It is important to note, however, that those skilled in the art will appreciate that the mechanisms of the embodiments described are capable of being distributed as a program product in a variety of forms, and that the invention applies regardless of the particular type of computer readable storage media utilized to carry out the distribution. Examples of computer readable storage media include, without limitation, recordable-type media such as CompactFlash cards, portable hard drives, diskettes, CD ROMs, memory sticks, and flash drives.

The corresponding structures, materials, acts, and equivalents of all means plus function elements in any claims below are intended to include any structure, material, or acts for performing the function in combination with other claim elements as specifically claimed.

Those skilled in the art will appreciate that many modifications to the exemplary embodiment are possible without departing from the scope of the present invention. In addition, it is possible to use some of the features of the present invention without the corresponding use of the other features. Accordingly, the foregoing description of the exemplary embodiment is provided for the purpose of illustrating the principles of the present invention and not in limitation thereof since the scope of the present invention is defined solely by the appended claims.

What is claimed:

1. A web-based system for management of land parcel records for a utility, comprising:
    a database for storing a plurality of documents pertaining to a plurality of land parcels;
    at least one hardware server for executing a plurality of components, including:
        a component for entering and storing a plurality of transmission lines information including right of way data pertaining to each land parcel being cleared for a transmission line, wherein the right of way data depends on transmission line voltage;
        a component for entering and storing a plurality of distribution permits information;
        a component for entering and storing a plurality of information including a module for maintaining a plurality of rights granted and a crossing access both pertaining to a each of the plurality of land parcels;
        a component for querying the database to retrieve the plurality of documents for a land parcel based on at least one search attribute, wherein the query is built by setting a value for one or more data fields via a query search user interface; and
        a component for enabling a user to perform administrative actions on a plurality of project and land parcel records stored in the database.

2. The system for management of land parcel records of claim 1 further comprising a component for entering and storing a plurality of agreements between the utility and an other utility granting a right to cross distribution facilities of the other utility.

3. The system for management of land parcel records of claim 1 further comprising a component for entering and storing a plurality of public use assessment documents.

4. The system for management of land parcel records of claim 1 wherein the component for entering and storing a plurality of distribution permits information comprises a software module for entering rights obtained for distribution lines.

5. The system for management of land parcel records of claim 1 wherein the component for entering and storing a plurality of information comprises a software module for maintaining compensation and deed restrictions information for each land parcel acquired by the utility.

6. The system for management of land parcel records of claim 1 wherein the component for entering and storing a plurality of information comprises a software module for tracking a cost for a sale of each of the plurality of land parcels, and a software module for generating a deed report and a closing statement for each sale parcel.

7. The system for management of land parcel records of claim 1 wherein the component for entering and storing a plurality of information comprises a software module for maintaining specific information related to lease types and lease terms, and a software module for generating at least one of a lease expiration report, a monthly revenue report, a rent adjustment report, an insurance expiration report.

8. The system for management of land parcel records of claim 1 wherein the component for enabling a user to perform administrative actions on a plurality of projects and land parcel records comprises a software module for adding, modifying, and deleting data types for records stored in the database.

9. A non-transitory computer readable storage medium for management of land parcel records for a utility when operated on a computer system, comprising:
- program instructions for storing a plurality of documents pertaining to a plurality of land parcels in a computer database;
- program instructions for entering and storing a plurality of transmission lines information including right of way data pertaining to each land parcel being cleared for a transmission line, wherein the right of way data depends on transmission line voltage;
- program instructions for entering and storing a plurality of distribution permits information;
- program instructions for entering and storing a plurality of information including program instructions for maintaining a plurality of rights and a crossing access both pertaining to each of the plurality of land parcels;
- program instructions for querying the database to retrieve the plurality of documents for a land parcel based on at least one search attribute, wherein the query is built by setting a value for one or more data fields via a query search user interface; and
- program instructions for performing administrative actions on a plurality of project and land parcel records stored in the database.

10. The non-transitory computer readable storage medium for management of land parcel records of claim 9 further comprising program instructions for entering and storing a plurality of agreements between the utility and an other utility granting a right to cross distribution facilities of the other utility.

11. The non-transitory computer readable storage medium for management of land parcel records of claim 9 further comprising program instructions for entering and storing a plurality of public use assessment documents.

12. The non-transitory computer readable storage medium for management of land parcel records of claim 9 wherein the program instructions for entering and storing a plurality of distribution permits information comprise program instructions for entering rights obtained for distribution lines.

13. The non-transitory computer readable storage medium for management of land parcel records of claim 9 wherein the program instructions for entering and storing a plurality of information comprise program instructions for maintaining compensation and deed restrictions information for each land parcel acquired by the utility.

14. The non-transitory computer readable storage medium for management of land parcel records of claim 9 wherein the program instructions for entering and storing a plurality of information comprise program instructions for tracking a cost for a sale of each of the plurality of land parcels, and program instructions for generating a deed report and a closing statement for each sale parcel.

15. The non-transitory computer readable storage medium for management of land parcel records of claim 9 wherein the program instructions for entering and storing a plurality of information comprise program instructions for maintaining specific information related to lease types and lease terms, and program instructions for generating at least one of a lease expiration report, a monthly revenue report, a rent adjustment report, and an insurance expiration report.

16. The non-transitory computer readable storage medium for management of land parcel records of claim 9 wherein the program instructions for performing administrative actions on a plurality of projects and land parcel records comprise program instructions for adding, modifying, and deleting data types for records stored in the database.

17. A web-based method for management of land parcel records for a utility when operated on a computer system, comprising:
- storing a plurality of documents pertaining to a plurality of land parcels in a computer database;
- entering and storing in the database a plurality of transmission lines information, including right of way data pertaining to each land parcel being cleared for a transmission line, wherein the right of way data depends on transmission line voltage;
- entering and storing in the database a plurality of distribution permits information;
- entering and storing in the database a plurality of information including information for maintaining a plurality of rights granted and a crossing access both pertaining to a each of the plurality of land parcels;
- querying the database to retrieve the plurality of documents from the database for a land parcel based on at least one search attribute, wherein the query is built by setting a value for one or more data fields via a query search user interface; and
- performing administrative actions on a plurality of project and land parcel records stored in the database.

18. The web-based method for management of land parcel records of claim 17 further comprising entering and storing a plurality of agreements between the utility and an other utility granting a right to cross distribution facilities of the other utility.

19. The web-based method for management of land parcel records of claim 17 further comprising entering and storing a plurality of public use assessment documents.

20. The web-based method for management of land parcel records of claim 17 wherein the step of entering and storing a plurality of distribution permits information comprises entering rights obtained for distribution lines.

21. The web-based method for management of land parcel records of claim 17 wherein the step of entering and storing a plurality of information comprises maintaining compensation and deed restrictions for each land parcel acquired by the utility.

22. The web-based method for management of land parcel records of claim 17 wherein the step of entering and storing a plurality of information comprises tracking a cost for a sale of each of the plurality of land parcels, and generating a deed report and a closing statement for each sale parcel.

23. The web-based method for management of land parcel records of claim 17 wherein the step of entering and storing a plurality of information comprises maintaining specific information related to lease types and lease terms, and generating at least one of a lease expiration report, a monthly revenue report, a rent adjustment report, and an insurance expiration report.

24. The web-based method for management of land parcel records of claim 17 wherein the step of enabling a user to perform administrative actions on a plurality of projects and land parcel records comprises adding, modifying, and deleting data types for records stored in the database.

* * * * *